Dec. 5, 1933. M. DUNKEL ET AL 1,937,554
PRODUCTION OF VALUABLE HYDROCARBONS
Filed Nov. 6, 1930
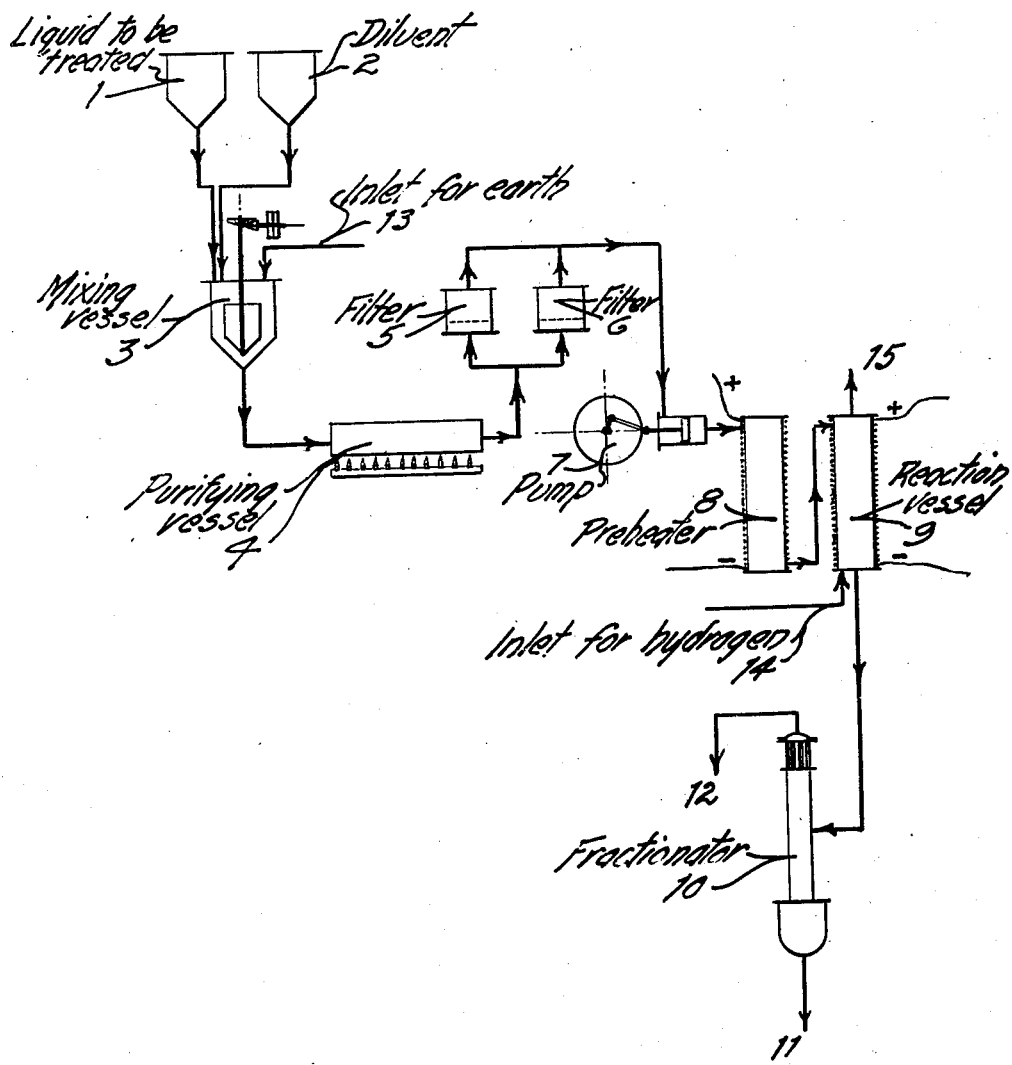
Inventors
MANFRED DUNKEL
EUGEN DORRER
By Attorneys
Hauff Sharland Patented Dec. 5, 1933

1,937,554

UNITED STATES PATENT OFFICE 1,937,554

PRODUCTION OF VALUABLE HYDRO-
CARBONS

Manfred Dunkel, Mannheim, and Eugen Dorrer, Ludwigshafen-on-the-Rhine, Germany, assignors to Standard-I. G. Company, Linden, N. J., a corporation of Delaware Application November 6, 1930, Serial No. 493,912, and in Germany November 25, 1929

8 Claims. (Cl. 196—78)

This invention relates to improvements in the manufacture and production of valuable hydrocarbons rich in hydrogen.

Hydrocarbons rich in hydrogen may be prepared from heavy liquid hydrocarbon distillation products, such as tars, petroleum residues, cracking residues, pitches and the like, by treatment in the liquid phase with hydrogen or gases containing or supplying hydrogen under pressure in the presence of catalysts, without the formation of hydrocarbons of low boiling point by the splitting off of carbon chains taking place to any appreciable extent. By this process, however, the yields frequently decrease after a time, since high molecular or resinifying deposits which tend to coke, settle on the catalysts and on the inner walls of the apparatus. Moreover, the efficiency of the catalysts sometimes tends not to be satisfactory because of the bad mixing of the materials to be hydrogenated by reason of the fact that the very viscous nature of the initial materials, and the slow diffusion of unhydrogenated constituents to the surface of the catalyst retard the reaction.

We have now found that in the said reactions these difficulties are obviated in a simple manner by rendering the initial materials readily mobile before the hydrogenation, which expression is also intended to include at the commencement of the treatment with hydrogen, by the addition of a sufficient quantity of hydrocarbons or mixtures of hydrocarbons which are solvents for the initial materials and which remain liquid under the reaction conditions.

The proportions of hydrocarbon solvents added may be varied within wide limits, for example, between 20 and 100 per cent of the materials to be diluted or more may be added. The amount of the solvent added increases with the viscosity of the material treated. So much of the diluent should however not be added as to endanger the economy of the process by rendering necessary the employment of too much heat for heating up the reaction vessel.

The hydrocarbons to be added may be changed by the hydrogenation or may remain unchanged during the process. The procedure is preferably as follows: the mixture from which the dust has advantageously previously been removed, as for example by filtration or adsorption, is pumped into the apparatus and is there treated with hydrogen under such conditions of pressure and temperature that an appreciable absorption of hydrogen by the material to be hydrogenated, and in some cases by the diluent, takes places, but in such a manner that neither the diluent nor the initial material to be treated is split to any appreciable extent into constituents of low boiling point. When the reaction is completed the diluent may be separated by distillation from the reaction products and used again.

Polynuclear hydrogenated aromatic hydrocarbons are especially suitable as diluents, as for example tetrahydronaphthalene, decahydronaphthalene and hydrogenated anthracenes, but hydrocarbons having a similar boiling point range, such as mineral coal tar oil, gas oil and the like may also be employed. Moreover, products which are formed from the initial materials under the reaction conditions may also be employed as diluents, in which case the diluents will often remain in the final product instead of being separated therefrom.

The process according to the present invention is usually carried out at temperatures above 300° centigrade and preferably at temperatures of between about 350° and 430° centigrade. Higher temperatures may also be employed.

Any pressures above 10 atmospheres may be employed in the said reaction, and preferably pressures of between 50 and 250 atmospheres, although even very much higher pressures may be employed.

The catalysts employed according to the process of the present invention are usually immune from poisoning by sulfur. Catalysts containing the solid oxides or sulfides of the metals of the second to the seventh groups of the periodic system or compounds of these metals supplying the said oxides or sulfides, preferably those of the sixth group, or mixtures thereof, and preferably in conjunction with metals of the eighth group, or with heavy metals of the first group of the periodic system, namely copper, silver or gold, or compounds thereof, consisting of or supplying oxides or sulfides or metals or mixtures of the same are preferably employed.

The following catalysts have been found to be particularly advantageous for carrying out the process according to the present invention. In the combination given, the metals insofar as they belong to the second to the seventh groups of the periodic system may be employed in the form of their oxides or sulfides, whereas the metals specified, which belong to the first and the eighth groups of the periodic system, may be employed in the metallic form or as compounds, such as, for example, oxides or sulfides, or as compounds supplying the said metals or the said compounds. The said catalysts may be mixed in any desired proportions, but usually molecular proportions have been found to be most advantageous. Such catalytic mixtures are, for example, cobalt and tungsten; iron and molybdenum; cobalt, molybdenum and copper; nickel and chromium; iron and calcium; nickel and arsenic; cobalt and antimony; zinc and molybdenum; nickel and tin; cadmium, iron and antimony; nickel and molybdenum; iron and tungsten; tin and lead; cobalt and molybdenum; aluminium and molybdenum; aluminium, chromium and nickel; platinum and tungsten; palladium and chromium; osmium and arsenic; osmium and molybdenum; cobalt and calcium; cobalt, nickel and chromium; palladium, zinc and molybdenum; aluminium, arsenic and chromium; copper, tungsten and tin; osmium, platinum and tin; nickel and antimony; silver, nickel and molybdenum; silver and molybdenum; tungsten, molybdenum and silver; cobalt and chromium; zinc and tungsten; cadmium, molybdenum and nickel; cadmium and molybdenum. As typical examples of carriers to which the said catalysts may be applied or on which they may be deposited may be mentioned, active charcoal, fuller's earth, Florida earth, diatomaceous earth, silica gel, alumina gel, pumice stone, bauxite, burnt fire-clay and the like.

The nature of the present invention will be further ascertained with reference to the accompanying drawing diagrammatically showing an elevation, partly in section, of a plant in which the process according to this invention may be carried out with advantage. The invention is, however, not restricted to the particular arrangement shown in this drawing.

Referring now in detail to the said drawing numeral 1 denotes a store-vessel from which the initial hydrocarbons to be purified are supplied into the mixing vessel 3 in which they are mixed with a suitable diluent, such as tetrahydronaphthalene, supplied from store-vessel 2. Small amounts, as for example 1 percent, of bleaching earth may be introduced at 13. From said mixing vessel 3 the mixture of initial materials and diluent is passed into a preliminary purifying vessel 4 in which, while gently warming, the solid impurities suspended in the initial materials are precipitated on the bleaching earth. The precipitate is removed from the liquid products by filtration in vessels 5 or 6 alternately used in order to secure a continuous operation. The filtered liquids are then brought to an elevated pressure by means of pump 7 and thereupon passed successively through the preheater 8 and the reaction vessel 9. Both preheater 8 and reaction vessel 9 may be heated by electrical means as indicated in the drawing or in any other suitable way. In vessel 9 the said liquids are brought into contact with a hydrogenating catalyst arranged in this vessel, hydrogen or a gas containing the same being simultaneously passed through in counter current. The hydrogen is introduced at 14 and withdrawn at 15. The purified hydrocarbons are then subjected to fractionation by distillation in column 10, the vapors evolved leaving at 12 while the constituents remaining liquid collect at the bottom and are withdrawn at 11.

The following example will further illustrate the nature of this invention, but the invention is not restricted thereto.

*Example*

A mineral coal tar having a density of 1.115 at 20° centigrade, from which the constituents boiling below 180° centigrade have been removed and which contains 50 per cent of pitch and which is practically insoluble in petroleum ether, is diluted with 50 per cent of tetrahydronaphthalene and the dust is removed therefrom by a little Florida earth. This mixture, after separation of the Florida earth, is then pumped in the liquid phase with hydrogen under a pressure of 200 atmospheres and at a temperature of from 400° to 420° centigrade through a catalyst prepared from tungsten sulfide and cobalt oxide at a rate corresponding to 3 tenths of the catalyst per hour. A product is obtained in which the phenols have to a large extent been converted into the corresponding hydrocarbons while the aromatic hydrocarbons have been converted into partially hydrogenated compounds, but the tetrahydronaphthalene itself has not been changed. The product is worked up by distillation; the constituents having the boiling point range of the tetrahydronaphthalene are used for the dilution of fresh initial materials.

Even after weeks of operation free from trouble, a product is obtained which only contains 5 per cent of pitch, which has a density of 0.950 at 20° centigrade and which is completely soluble in petroleum ether.

Splitting of the carbon chains only occurs to a negligible extent and the loss by the formation of gas only amounts to 2 per cent.

If the same tar be employed without a diluent, then, with the same throughout, the activity of the catalyst commences to subside even after a few days, and when the apparatus is opened after operation for four weeks, large deposits of crusts of coke are found on the inner walls.

What we claim is:

1. In the production of hydrocarbons rich in hydrogen from a heavy liquid hydrocarbon distillation product by treatment in the liquid phase at a temperature between 300° and 430° C. and under a pressure of at least 10 atmospheres with a gas comprising hydrogen in the presence of a hydrogenating catalyst immune to poisoning by sulphur but under conditions milder than those required for the formation of hydrocarbons of low boiling point by the splitting off of carbon chains to an appreciable extent, the step of rendering the said distillation product readily mobile before the said treatment with a gas comprising hydrogen by the addition of a hydrocarbon which is a solvent for the said distillation product and which remains liquid under the said conditions.

2. In the production of hydrocarbons rich in hydrogen from a heavy liquid hydrocarbon distillation product by treatment in the liquid phase at a temperature between 300° and 430° C. and under a pressure of at least 10 atmospheres with a gas comprising hydrogen in the presence of a hydrogenating catalyst immune to poisoning by sulphur, but under conditions milder than those required for the formation of hydrocarbons of low boiling point by the splitting off of carbon chains to an appreciable extent, the step of rendering the said distillation product readily mobile before said treatment with a gas comprising hydrogen by the addition of between 20 and 100 per cent of a hydrocarbon which is a solvent for the said distillation product and which remains liquid under the said conditions.

3. In the production of hydrocarbons rich in hydrogen from a heavy liquid hydrocarbon distillation product by treatment in the liquid phase at a temperature between 300° and 450° C. and under a pressure of at least 10 atmospheres with a gas comprising hydrogen in the presence of a hydrogenating catalyst immune to poisoning by sulphur, but under conditions milder than those required for the formation of hydrocarbons of low boiling point by the splitting off of carbon chains to an appreciable extent, the step of rendering the said distillation product readily mobile before said treatment with a gas comprising hydrogen by the addition of a polynuclear hydroaromatic hydrocarbon which is a solvent for the said distillation product and which remains liquid under the said conditions.

4. In the production of hydrocarbons rich in hydrogen from a heavy liquid hydrocarbon distillation product by treatment in the liquid phase at a temperature between 300° and 430° C. and under a pressure of at least 10 atmospheres with a gas comprising hydrogen in the presence of a hydrogenating catalyst immune to poisoning by sulphur, but under conditions milder than those required for the formation of hydrocarbons of low boiling point by the splitting off of carbon chains to an appreciable extent, the step of rendering the said distillation product readily mobile before said treatment with a gas comprising hydrogen by the addition of between 20 and 100 per cent of a polynuclear hydroaromatic hydrocarbon which is a solvent for the said distillation product and which remains liquid under the said conditions.

5. A process for the production of products rich in hydrogen from a mineral coal tar, which comprises mixing said tar with 50 per cent of tetrahydronaphthalene and treating the mixture thus obtained in the liquid phase with hydrogen under a pressure of about 200 atmospheres and at a temperature of from 400° to 420° C. in the presence of a catalyst comprising a sulfide of a metal of the sixth group of the periodic system.

6. In the production of hydrocarbons rich in hydrogen from a heavy liquid hydrocarbon distillation product by treatment in the liquid phase at a temperature between 350° and 420° C. and under a pressure between 50 and 250 atmospheres with a gas comprising hydrogen in the presence of a hydrogenating catalyst immune to poisoning by sulphur, but under conditions milder than those required for the formation of hydrocarbons of low boiling point by the splitting off of carbon chains to an appreciable extent, the step of rendering the said distillation product readily mobile before the said treatment with a gas comprising hydrogen by the addition of a hydrocarbon which is a solvent for the said distillation product and which remains liquid under the said conditions.

7. In the production of hydrocarbons rich in hydrogen from a heavy liquid hydrocarbon distillation product by treatment in the liquid phase at a temperature between 350° and 420° C. and under a pressure between 50 and 250 atmospheres with a gas comprising hydrogen in the presence of a hydrogenating catalyst immune to poisoning by sulphur, but under conditions milder than those required for the formation of hydrocarbons of low boiling point by the splitting off of carbon chains to an appreciable extent, the step of rendering the said distillation product readily mobile before said treatment with a gas comprising hydrogen by the addition of between 20 and 100 per cent of a hydrocarbon which is a solvent for the said distillation product and which remains liquid under the said conditions.

8. In the production of hydrocarbons rich in hydrogen from a heavy liquid hydrocarbon distillation product by treatment in the liquid phase at a temperature between 350° and 420° C. and under a pressure between 50 and 250 atmospheres with a gas comprising hydrogen in the presence of a hydrogenating catalyst immune to poisoning by sulphur, but under conditions milder than those required for the formation of hydrocarbons of low boiling point by the splitting off of carbon chains to an appreciable extent, the step of rendering the said distillation product readily mobile before said treatment with a gas comprising hydrogen by the addition of a polynuclear hydroaromatic hydrocarbon which is a solvent for the said distillation product and which remains liquid under the said conditions.

MANFRED DUNKEL.
EUGEN DORRER.